(12) United States Patent
Isherwood et al.

(10) Patent No.: US 10,489,412 B2
(45) Date of Patent: Nov. 26, 2019

(54) HIGHLY AVAILABLE SEARCH INDEX WITH STORAGE NODE ADDITION AND REMOVAL

(75) Inventors: Benjamin Isherwood, Tewksbury, MA (US); Jeffrey M. Crump, Wakefield, MA (US); Yury Kats, Belmont, MA (US)

(73) Assignee: Hitachi Vantara Corporation, Santa Clara, CA (US)

( * ) Notice: Subject to any disclaimer, the term of this patent is extended or adjusted under 35 U.S.C. 154(b) by 111 days.

(21) Appl. No.: 14/362,637

(22) PCT Filed: Mar. 29, 2012

(86) PCT No.: PCT/US2012/031114
§ 371 (c)(1),
(2), (4) Date: Jun. 4, 2014

(87) PCT Pub. No.: WO2013/147785
PCT Pub. Date: Oct. 3, 2013

(65) Prior Publication Data
US 2014/0330785 A1    Nov. 6, 2014

(51) Int. Cl.
| | |
|---|---|
| G06F 7/00 | (2006.01) |
| G06F 16/2458 | (2019.01) |
| G06F 11/14 | (2006.01) |
| H04L 29/08 | (2006.01) |
| G06F 16/22 | (2019.01) |
| G06F 16/21 | (2019.01) |
| G06F 11/10 | (2006.01) |

(52) U.S. Cl.
CPC ...... *G06F 16/2458* (2019.01); *G06F 11/1435* (2013.01); *G06F 11/1446* (2013.01); *G06F 16/21* (2019.01); *G06F 16/22* (2019.01); *H04L 67/10* (2013.01); *G06F 11/1076* (2013.01)

(58) Field of Classification Search
CPC .................. G06F 17/30575; G06F 11/1076
USPC ........................................... 707/705
See application file for complete search history.

(56) References Cited

U.S. PATENT DOCUMENTS

| | | | |
|---|---|---|---|
| 7,155,466 B2 | 12/2006 | Rodriguez et al. | |
| 7,657,581 B2 | 2/2010 | Orenstein et al. | |
| 7,725,470 B2 | 5/2010 | Richards et al. | |
| 7,752,185 B1 * | 7/2010 | Kilmartin | G06F 17/30321 707/609 |
| 8,224,860 B2 * | 7/2012 | Starkey | G06F 16/27 707/792 |

(Continued)

*Primary Examiner* — Eliyah S. Harper
(74) *Attorney, Agent, or Firm* — Mattingly & Malur, PC

(57) ABSTRACT

A redundant array of independent nodes are networked together. Each node executes an instance of an application that provides object-based storage. The nodes are grouped into systems each having multiple nodes. A search index is provided in each system for locating objects within the system. A method of managing the search index comprises splitting the search index into shards to be divided among a plurality of regions (704). The regions are larger in number than the nodes in the system. Each region has a master and at least one backup copy of one of the shards. A shard core is a master or backup copy of a shard. The method further comprises distributing the shard cores to the nodes, and providing a region mapping table in each node in the system to map the shard cores to the nodes in which the shard cores are stored (706).

10 Claims, 10 Drawing Sheets

(56) References Cited

U.S. PATENT DOCUMENTS

| | | | |
|---|---|---|---|
| 8,380,738 B2* | 2/2013 | Tatemura | G06F 16/25 707/770 |
| 8,775,373 B1* | 7/2014 | Ross | H04L 67/1095 707/612 |
| 8,838,534 B2* | 9/2014 | Fowler | G06F 9/466 707/615 |
| 9,069,808 B2* | 6/2015 | Kementsietsidis | G06F 16/22 |
| 9,336,263 B2* | 5/2016 | Abadi | G06F 16/258 |
| 2007/0189153 A1 | 8/2007 | Mason | |
| 2011/0041006 A1* | 2/2011 | Fowler | G06F 9/466 714/10 |
| 2011/0078227 A1* | 3/2011 | McAloon | G06F 11/3006 709/201 |
| 2011/0106802 A1 | 5/2011 | Pinkney et al. | |
| 2011/0191300 A1 | 8/2011 | Orenstein et al. | |
| 2011/0196855 A1* | 8/2011 | Wable | G06Q 30/02 707/711 |
| 2011/0238830 A1* | 9/2011 | Giampaolo | G06F 16/11 709/224 |
| 2012/0079190 A1* | 3/2012 | Colgrove | G06F 11/1076 711/114 |
| 2012/0084504 A1* | 4/2012 | Colgrove | G06F 3/0605 711/114 |
| 2012/0084505 A1* | 4/2012 | Colgrove | G06F 11/1076 711/114 |
| 2012/0084506 A1* | 4/2012 | Colgrove | G06F 11/1076 711/114 |
| 2012/0109892 A1* | 5/2012 | Novik | G06F 16/278 707/633 |
| 2012/0109926 A1* | 5/2012 | Novik | G06F 16/256 707/707 |
| 2012/0215779 A1* | 8/2012 | Lipstone | H04L 65/4084 707/737 |
| 2013/0042140 A1* | 2/2013 | Bhogal | G06F 16/27 714/6.2 |
| 2013/0046949 A1* | 2/2013 | Colgrove | G06F 3/0608 711/170 |
| 2013/0086353 A1* | 4/2013 | Colgrove | G06F 3/0608 711/206 |

* cited by examiner

| REGION | PRIMARY | BACKUP 1 |
|--------|---------|----------|
| 1 | n1 | n4 |
| 2 | n2 | n1 |
| 3 | n3 | n2 |
| 4 | n4 | n3 |
| 5 | n1 | n4 |
| 6 | n2 | n1 |
| 7 | n3 | n2 |
| 8 | n4 | n3 |

HIGHLY AVAILABLE SEARCH INDEX WITH STORAGE NODE ADDITION AND REMOVAL

BACKGROUND OF THE INVENTION

The present invention relates generally to storage systems and, more particularly, to system and method for providing a highly available search index with storage node addition and removal in a replicated object storage system.

The amount of digital content is growing at an exponential rate and requires substantial storage systems to store and manage the content. Much of the content is unchanging content (fixed) and can be stored on a lower cost storage system. With all this fixed content being stored, it increasingly becomes important to be able to locate the content based on content metadata criteria. A large scale search index engine can be implemented by establishing horizontal partitioning of the index content where each node contains parts of the index. This methodology is called sharding. These shards are distributed to one per each node participating in the index database. This has the benefit of distributing the load of a very large index across multiple nodes.

When a cluster node is added or removed from the cluster environment or a shard becomes unavailable, the full index must be rebuilt to redistribute the index records within the new number of shards to facilitate a valid hashing algorithm used to identify the shard for specific index content. Re-indexing could take a long time and make the index unavailable for the duration. Additionally, when a shard of the index becomes unavailable either from a node being down or corruption of an individual shard, the full index must be restored from a backup (or replicated) copy or the index must be deleted and regenerated. To complete the index recovery again can take a very long time.

BRIEF SUMMARY OF THE INVENTION

Exemplary embodiments of the invention provide a highly available search index distribution implemented in a manner that splits up the index into regions. The number of regions is determined based on the cluster configuration during initial index creation. The number of regions is greater than, preferably much greater than, the number of nodes in the cluster. Each region will have master and optional backup(s) of a piece (shard) of the index. To locate the regions, each node contains an identical region mapping table to indicate where the regions exist in the cluster. This technique is used to manage a database search index to achieve high availability and allow for node expansion/reduction without requiring the regeneration of the whole index. The solution handles the following situations:

1. When a node is added to the cluster, there are no new regions added to the cluster. Instead, the region indices are redistributed amongst all the nodes in the cluster to help distribute the work load.

2. When a node is temporarily unavailable or an index copy becomes corrupted, the region index is still available by redirecting the activity to a backup copy that exists on another node as indicated in the region mapping table.

3. When a node is removed or is permanently unavailable, the high availability of the regions in the cluster must be maintained for those shards that existed on the node. The regions index copy will be regenerated on another node in the cluster.

4. When either the master or a backup copy becomes corrupted, it will be regenerated from another copy in the cluster. If necessary, as when a node is added or removed/regenerated, the hash algorithm is re-evaluated to facilitate the new region distribution. With the new hash algorithm, a new region mapping table is regenerated and distributed to all nodes in the cluster. Performing this remapping in the region mapping table is far faster than regenerating the indices into a different shard bucket configuration.

A redundant array of independent nodes are grouped into a plurality of systems each having multiple nodes. A search index is provided in each system. In accordance with an aspect of the present invention, a method of managing the search index in the system comprises: splitting the search index into a plurality of shards to be divided among a plurality of regions equal in number to the plurality of shards, a number of the regions being larger than a number of the nodes in the system, each region having a master and at least one backup copy of one of the shards, wherein a shard core is a master of a shard or a backup copy of a shard; distributing the shard cores to the plurality of nodes in the system; and providing a region mapping table in each node in the system to map the shard cores to the nodes in the system in which the shard cores are stored.

In some embodiments, the shard cores are distributed to the plurality of nodes in the system so that, for a shard, the master and the at least one backup copy are stored in separate nodes if storage space is available, and if not, the master and the at least one backup copy are stored in separate volumes in the same node. The shard cores are distributed to the plurality of nodes in the system based on volume load of volumes of the nodes to store the shard cores, by favoring volumes that have no shard cores and volumes that have more space for storing shard cores than other volumes. The method further comprises determining the number of regions in which to split the search index based on one or more of (1) the number of nodes in the system, (2) Index Protection Level (IPL) of the search index which controls the number of backup copies for the master per region, and (3) node hardware capability of the nodes to handle hosting multiple shard cores.

In specific embodiments, the method further comprises, for node addition of a node in the system: evaluating available resources on all the nodes on the system to determine placement of the shard cores among the nodes including the additional node; redistributing the shard cores among the nodes in the system based on the evaluation of the available resources; regenerating the region mapping table based on the redistribution of the shard cores; and distributing the regenerated region mapping table to all the nodes in the system. The method further comprises, for node removal of a node in the system: evaluating available resources on all the nodes on the system to determine placement of the shard cores among the nodes without the removed node; redistributing the shard cores among the nodes in the system based on the evaluation of the available resources; regenerating the region mapping table based on the redistribution of the shard cores; and distributing the regenerated region mapping table to all the nodes in the system. The method further comprises, for core recovery in the system after a node becomes unavailable for a preset threshold amount of time: locating one or more nodes in the system that have the master or backup copy of the shard cores that are missing due to the unavailable node; identifying one or more destination nodes in the system in which to provide the missing shard cores; copying the missing shard cores to the one or more destination nodes; updating the region mapping table based on the copying of the missing shard cores to the one or more destination nodes; and distributing the updated region mapping table to all the nodes in the system.

In accordance with another aspect of the invention, an apparatus for managing a search index provided in each system comprises a processor, a memory, and an indexing module. The indexing module is configured to: split the search index into a plurality of shards to be divided among a plurality of regions equal in number to the plurality of shards, a number of the regions being larger than a number of the nodes in the system, each region having a master and at least one backup copy of one of the shards, wherein a shard core is a master of a shard or a backup copy of a shard; distribute the shard cores to the plurality of nodes in the system; and provide a region mapping table in each node in the system to map the shard cores to the nodes in the system in which the shard cores are stored.

Another aspect of this invention is directed to a computer-readable storage medium storing a plurality of instructions for controlling a data processor to manage a search index provided in each system. The plurality of instructions comprise: instructions that cause the data processor to split the search index into a plurality of shards to be divided among a plurality of regions equal in number to the plurality of shards, a number of the regions being larger than a number of the nodes in the system, each region having a master and at least one backup copy of one of the shards, wherein a shard core is a master of a shard or a backup copy of a shard; instructions that cause the data processor to distribute the shard cores to the plurality of nodes in the system; and instructions that cause the data processor to provide a region mapping table in each node in the system to map the shard cores to the nodes in the system in which the shard cores are stored.

These and other features and advantages of the present invention will become apparent to those of ordinary skill in the art in view of the following detailed description of the specific embodiments.

DETAILED DESCRIPTION OF THE INVENTION

Figure 1:
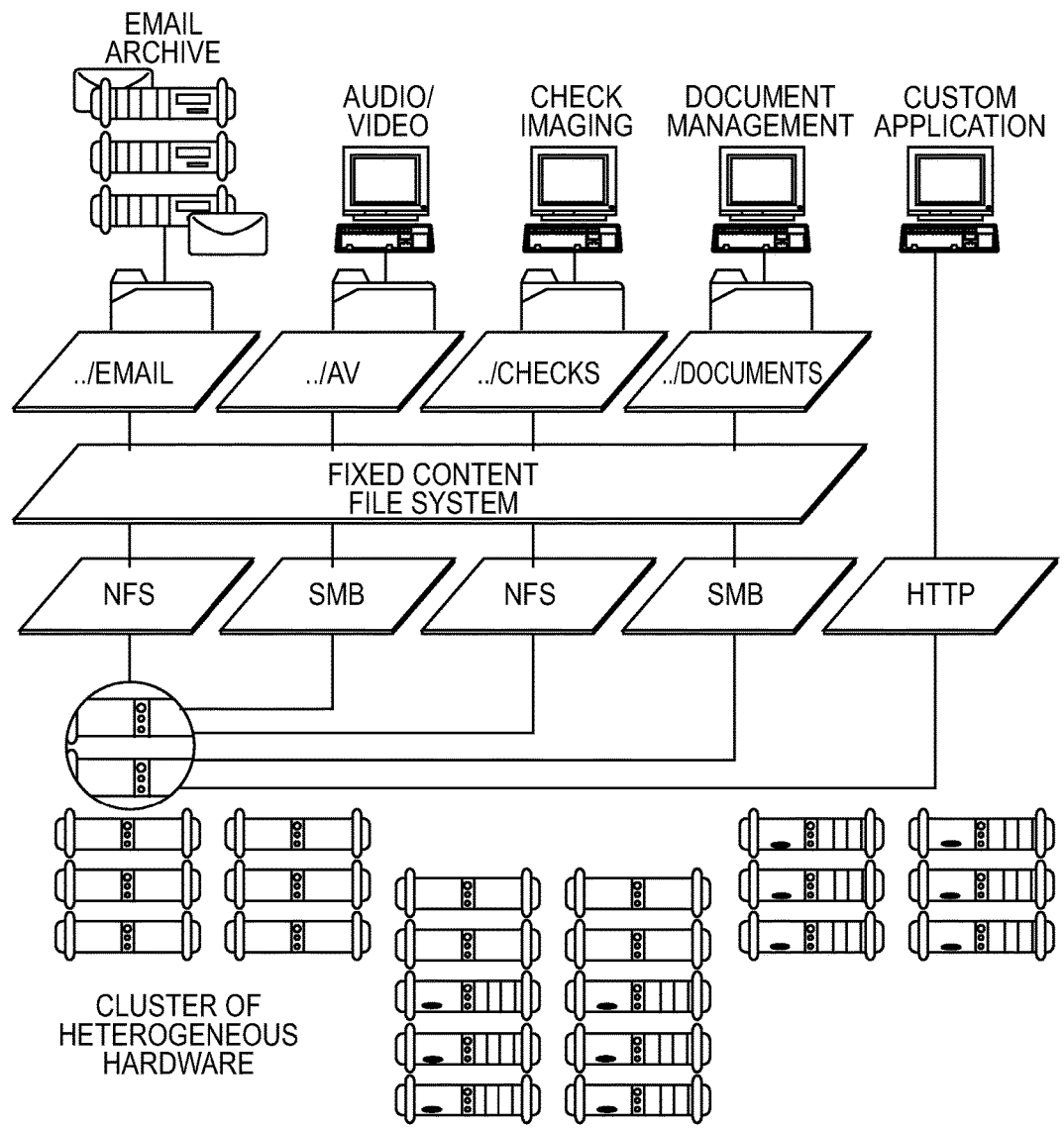
FIG. 1 is a simplified block diagram of a fixed content storage archive in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for managing a highly available search index with storage node addition and removal.

I. Fixed Content Distributed Data Storage

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

FIG. 1 illustrates one such scalable disk-based archival storage management system. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. The software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

Figure 2:
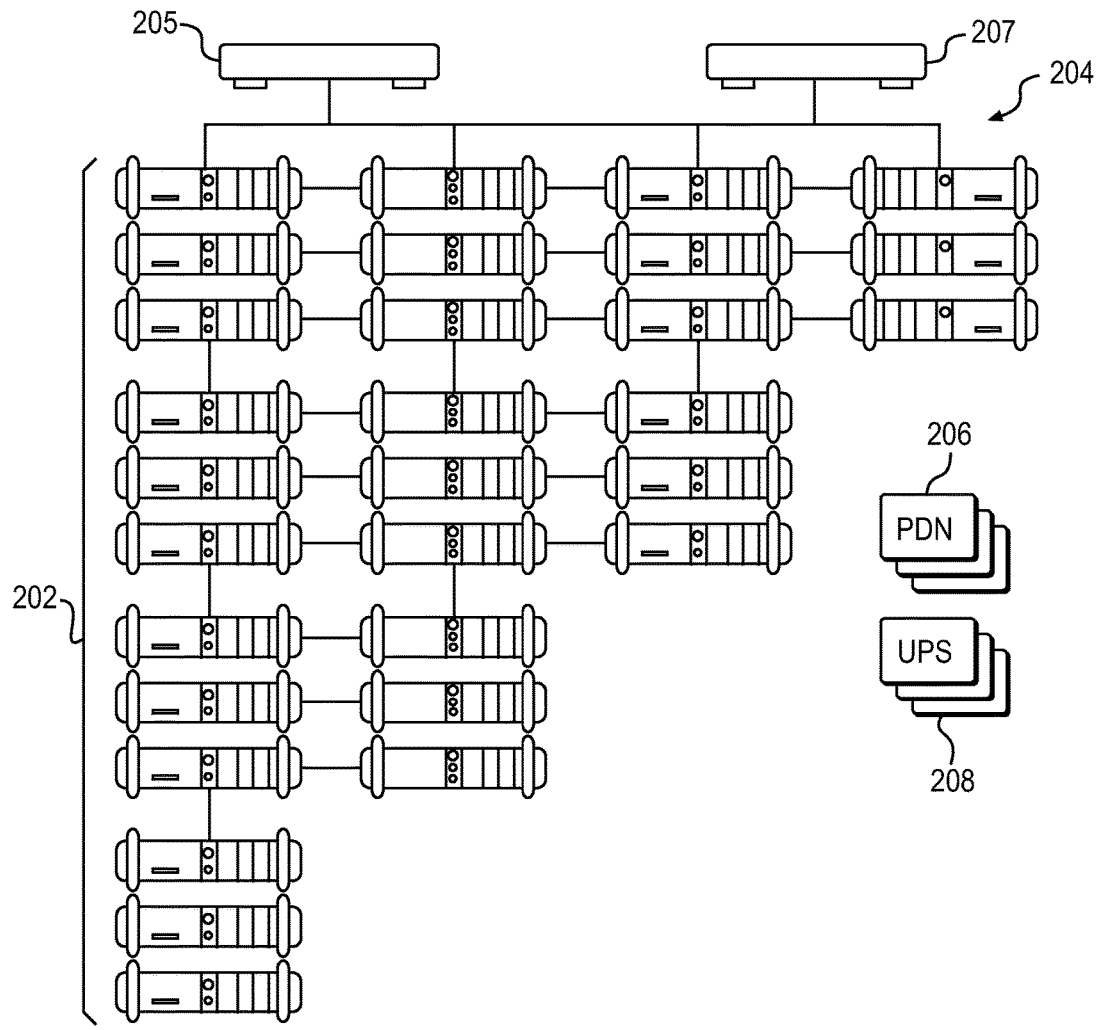
FIG. 2 is a simplified representation of a redundant array of independent nodes each of which is symmetric and supports an archive cluster application.

As described in commonly owned U.S. Pat. No. 7,155,466, it is known in a RAIN-based archival system to incorporate a distributed software application executed on each node that captures, preserves, manages, and retrieves digital assets. FIG. 2 illustrates one such system. A physical boundary of an individual archive is referred to as a cluster (or a system). Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements.

In storage systems such as described above, data typically is distributed across the cluster randomly so that the archive is always protected from device failure. If a disk or node fails, the cluster automatically fails over to other nodes in the cluster that maintain replicas of the same data. While this approach works well from a data protection standpoint, a calculated mean time to data loss (MTDL) for the cluster may not be as high as desired. In particular, MTDL typically represents a calculated amount of time before the archive will lose data. In a digital archive, any data loss is undesirable, but due to the nature of hardware and software components, there is always a possibility (however remote) of such an occurrence. Because of the random distribution of objects and their copies within an archive cluster, MTDL may end up being lower than required since, for example, a needed copy of an object may be unavailable if a given disk (on which a mirror copy is stored) within a given node fails unexpectedly.

As shown in FIG. 2, an illustrative cluster in which the present invention is implemented preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2 U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or Gig E switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program, or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs an instance 300 of the distributed application (which may be the same instance, or substantially the same instance), which comprises several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process. The request manager orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse directly local structures.

Figure 3:
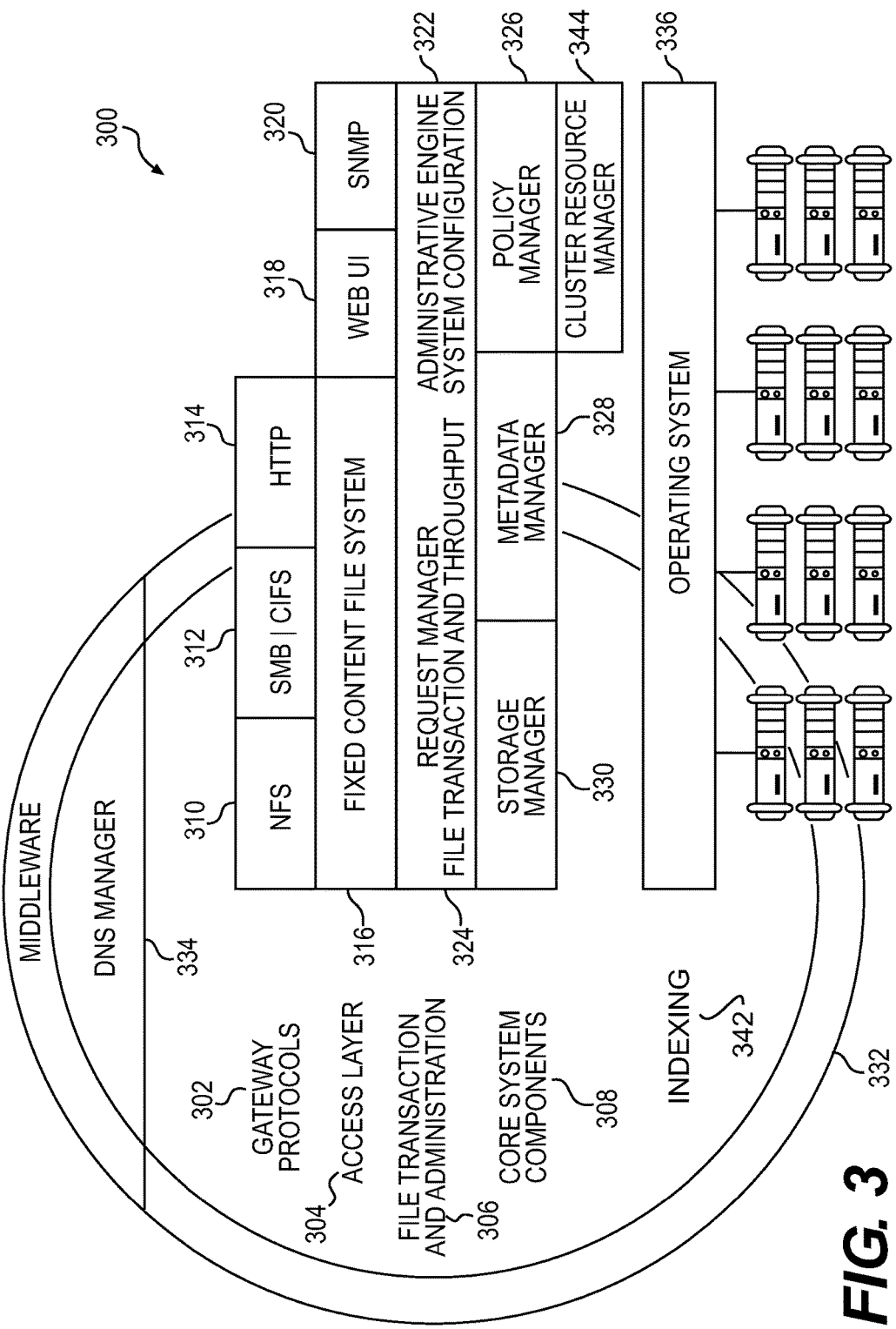
FIG. 3 is a high level representation of the various components of the archive cluster application executing on a given node.

As also illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, an application such as the HCP (Hitachi Content Platform) application instance executes on a base operating system 336, such as Red Hat Linux 9.0, Fedora Core 6, or the like. The communications middleware is any convenient distributed communication mechanism. Other components may include FUSE (Filesystem in USErspace), which may be used for the Fixed Content File System (FCFS) 316. The NFS gateway 310 may be implemented by a standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file, it generates a full path and file name for the representation for which it will be responsible. In a representative embodiment, each object to be stored on a storage manager is received as raw data to be stored, with the storage manager then adding its own metadata to the file as it stores the data to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type), and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

Internal files may be "chunks" of data representing a portion of the original "file" in the archive object, and they may be placed on different nodes to achieve striping and protection blocks. This breaking apart of an external file into smaller chunked units is not a requirement, however; in the alternative, internal files may be complete copies of the external file. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager is responsible for executing the set of operations needed to perform archive actions by interacting with other components within the system. The request manager supports many simultaneous actions of different types, is able to roll-back any failed transactions, and supports transactions that can take a long time to execute. The request manager further ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files. Additional details of the fixed content distributed data storage can be found in U.S. Patent Publication No. 2007/0189153 and U.S. Pat. No. 7,657,581, which are incorporated herein by reference.

II. Metadata Management

A metadata management system is responsible for organizing and providing access to given metadata, such as system metadata. This system metadata includes information on files placed in the archive, as well as configuration information, information displayed on the administrative UI, metrics, information on irreparable policy violations, and the like. Although not illustrated in detail, other types of metadata (e.g., user metadata associated with archived files) may also be managed using the metadata management system that is now described.

In a representative embodiment of the cluster, the metadata management system provides persistence for a set of metadata objects, which may include one or more of the following object types (which are merely illustrative):

External File: a file as perceived by a user of the archive;

Internal File: a file stored by the Storage Manager; typically, there may be a one-to-many relationship between External Files and Internal Files.

ConfigObject: a name/value pair used to configure the cluster;

AdminLogEntry: a message to be displayed on the administrator UI;

MetricsObject: a timestamped key/value pair, representing some measurement of the archive (e.g., number of files) at a point in time; and PolicyState: a violation of some policy.

Each metadata object may have a unique name that preferably never changes. Metadata objects are organized into regions. A region comprises an authoritative region copy and a "tolerable points of failure" (TPOF) number (a set of zero or more) backup region copies. With zero copies, the metadata management system is scalable but may not be highly available. A region is selected by hashing one or more object attributes (e.g., the object's name, such as a fully qualified pathname, or portion thereof) and extracting a given number of bits of the hash value. These bits comprise a region number. The bits selected may be low order bits, high order bits, middle order bits, or any combination of individual bits. In a representative embodiment, the given bits are the low order bits of the hash value. The object's attribute or attributes may be hashed using any convenient hash function. These include, without limitation, a Java-based hash function such as java.lang.string.hashCode, and the like. Preferably, the number of bits comprising the region number is controlled by a configuration parameter, referred to herein as regionMapLevel. If this configuration parameter is set to 6, for example, this results in $2^6=64$ regions. Of course, a larger number of regions are permitted, and the number of regions may be adjusted automatically using a namespace partitioning scheme.

Each region may be stored redundantly. As noted above, there is one authoritative copy of the region, and zero or more backup copies. The number of backup copies is controlled by the metadata TPOF configuration parameter, as has been described. Preferably, region copies are distributed across all the nodes of the cluster so as to balance the number of authoritative region copies per node, and to balance the number of total region copies per node.

The metadata management system stores metadata objects in a database running on each node. This database is used to support the region map. An exemplary database is implemented using PostgreSQL, which is available as open source. Preferably, there is a schema for each region copy, and in each schema there is a table for each type of metadata object. A schema is simply a namespace that can own tables, indexes, procedures, and other database objects. Each region preferably has its own schema. Each schema has a complete set of tables, one for each metadata object. A row in one of these tables corresponds to a single metadata object. While Postgres is a preferred database, any convenient relational database (e.g., Oracle, IBM DB/2, or the like) may be used.

As used herein, a namespace is a logical partition of the cluster, and essentially serves as a collection of objects particular to at least one defined application. Each namespace has a private filesystem with respect to other namespaces. Moreover, access to one namespace does not grant a user access to another namespace. A cluster/system of nodes is a physical archive instance.

Figure 4:
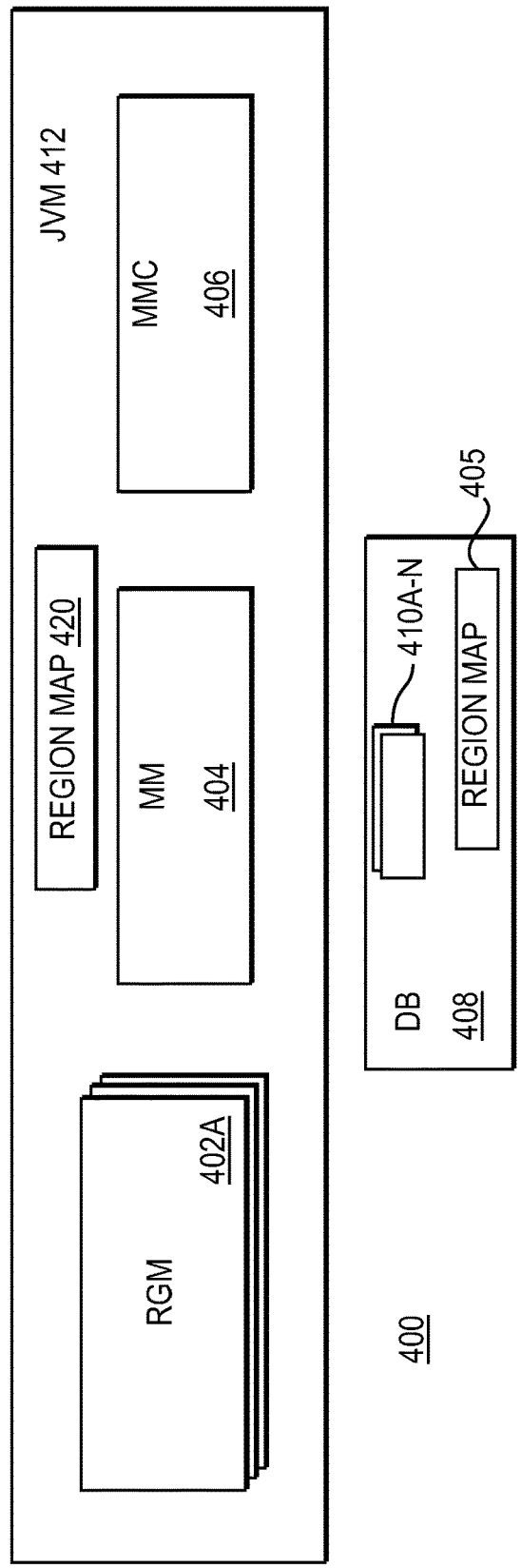
FIG. 4 illustrates an example of the components of the metadata management system on a given node of the cluster.

As illustrated in FIG. 4, each node 400 has a set of processes or components: one or more region managers (RGM) 402a-n, a metadata manager (MM) 404, at least one metadata manager client (MMC) 406, and a database 408 having one or more schemas 410a-n. The RGM(s), MM and MMC components execute with a virtual machine 412, such as a Java virtual machine. There is one RGM for each region copy. Thus, there is an RGM for the authoritative region copy, an RGM for each backup region copy, and an RGM for each incomplete region copy. There is also a database schema 410 for each RGM 402, which manages that schema. The database also stores the region map 405. Each node preferably has the same global view of the region map, with requirement being enforced by a synchronization scheme. A region manager RGM 402 is responsible for operating on a region copy (be it authoritative, backup or incomplete, as the case may be), and for executing requests submitted by the metadata manager clients 406 and by other region managers 402. Requests are provided to a given RGM through any convenient means, such as the communications middleware or other messaging layer illustrated in FIG. 3. The region manager provides an execution environment in which these requests execute, e.g., by providing a connection to the database, configured to operate on the schema that is being managed by that RGM. Each region manager stores its data in the database 408. The metadata manager 404 is a top-level component responsible for metadata management on the node. It is responsible for creating and destroying region managers (RGMs) and organizing resources needed by the RGMs, e.g., cluster configuration information and a pool of database connections. Preferably, a given metadata manager (in a given node) acts as a leader and is responsible for determining which metadata managers (across a set or subset of nodes) are responsible for which region copies. A leader election algorithm, such as the bully algorithm, or a variant thereof, may be used to select the metadata manager leader. Preferably, each node has a single metadata manager, although it is possible to run multiple MMs per node. Once region ownership has been established by the namespace partitioning scheme (as will be described below), each metadata manager is responsible for adjusting its set of one or more region managers accordingly. System components (e.g., the administrative engine, the policy manager, and the like) interact with the metadata manager MM through the metadata manager client. The MMC is responsible (using the region map) for locating the RGM to carry out a given request, for issuing the request to the selected RGM, and for retrying the request if the selected RGM is unavailable (because, for example, the node has failed). In the latter case, a retry request will succeed when a new region map is received at the node.

As mentioned above, a region map identifies the node responsible for each copy of each region. The virtual machine 412 (and each RGM, MM and MMC component therein) has access to the region map 405; a copy 420 of the region map, after it has been copied into the JVM, is also shown in FIG. 4. The region map thus is available to both the JVM and the database in a given node. In this illustrative embodiment, each metadata object has an attribute (e.g., a name), which is hashed to yield an integer between 0x0 and 0x3fffffff inclusive, i.e., 30-bit values. These values can be represented comfortably in a signed 32-bit integer without running into overflow issues (e.g., when adding 1 to the high end of the range). The 30 bits allow for up to approximately 1 billion regions, which is sufficient even for large clusters. A region represents a set of hash values, and the set of all regions covers all possible hash values. There is a different bit position for each region, and the different bit positions preferably are in a fixed order. Thus, each region is identified by a number, which preferably is derived by extracting the RegionLevelMap bits of the hash value. Where the configuration parameter is set to 6, allowing for 64 regions, the resulting hash values are the numbers 0x0 through 0x3f.

As previously noted, a region copy is in one of three (3) states: "authoritative," "backup" and "incomplete." If the region copy is authoritative, all requests to the region go to this copy, and there is one authoritative copy for each region. If the region copy is a backup, the copy receives backup requests (from an authoritative region manager process). A region copy is incomplete if metadata is being loaded but the copy is not yet synchronized (typically, with respect to other backup copies). An incomplete region copy is not eligible for promotion to another state until synchronization is complete, at which point the copy becomes a backup copy. Each region has one authoritative copy and a given number (as set by the metadataTPOF configuration parameter) backup or incomplete copies.

A backup region copy is kept synchronized with the authoritative region copy by enforcing a given protocol (or "contract") between an authoritative region copy and its TPOF backup copies. This protocol is now described.

By way of brief background, when an update request is received at an MMC, the MMC does a lookup on the local region map to find the location of the authoritative region copy. The MMC sends the update request to the RGM associated with the authoritative region copy, which then commits it. The update is also sent (by the RGM associated with the authoritative region copy) to the RGM of each of the TPOF backup copies. The authoritative RGM, however, in order to indicate success, need not wait for each RGM associated with a backup region copy to commit the update; rather, when an RGM associated with a backup region copy receives the update, it immediately returns or tries to return (to the authoritative RGM) an acknowledgement. This acknowledgement is issued when the backup request is received and before it is executed. In the case where no failures occur, once the authoritative RGM receives all of the acknowledgements, it notifies the MMC, which then returns a success to the caller. If, however, a given failure event occurs, the protocol ensures that the impacted RGM (whether backup or authoritative) removes itself (and potentially the affected node) from service, and a new region map is issued by the MM leader. Preferably, the RGM removes itself from service by bringing down the JVM although any convenient technique may be used. The new map specifies a replacement for the lost region copy. In this manner, each backup region copy is a "hot standby" for the authoritative region copy and is thus eligible for promotion to authoritative if and when needed (either because the authoritative RGM fails, for load balancing purposes, or the like).

There are several ways in which the update process can fail. Thus, for example, the authoritative region manager (while waiting for the acknowledgement) may encounter an exception indicating that the backup manager process has died or, the backup manager process may fail to process the update request locally even though it has issued the acknowledgement or, the backup region manager process while issuing the acknowledgement may encounter an exception indicating that the authoritative region manager process has died, and so on. As noted above, if a given backup RGM cannot process the update, it removes itself from service. Moreover, when either a backup RGM or the authoritative RGM dies, a new region map is issued.

The metadata management system keeps copies of a region synchronized. An update that is done to an object in the authoritative region copy is replicated on the backup region copies. Once an update is committed by the authoritative RGM, the same update is applied to all backup region copies. The metadata management system ensures that any such failure (whether at the node level, the region manager level or the like) causes reassignment of region copies on the failed node; thus, the integrity of the remaining region copies is guaranteed. If a node containing an authoritative RGM fails, then the backup RGMs are either in sync (with or without a currently executing update), or they are out of sync only by the update that was interrupted. In the latter case, re-synchronizing is easy. Because backup regions are kept synchronized with authoritative regions, a promotion (from backup to authoritative) is instantaneous.

A node failure is also likely to lose backup regions. A backup region is restored by creating, on some other node, a new, incomplete region. As soon as the incomplete region is created, it starts recording updates and starts copying data from the authoritative region. When the copying is complete, the accumulated updates are applied, resulting in an up-to-date backup. The new backup region then informs the MM leader that it is up to date, which will cause the MM leader to send out a map including the promotion of the region (from incomplete to backup).

It should be noted that there is no requirement that the number of regions correspond to the number of nodes. More generally, the number of regions is uncorrelated with the number of nodes in the array of independent nodes. Additional details of the metadata management can be found in U.S. Pat. No. 7,657,581.

III. Highly Available Search Index

In a replicated object storage system or content platform having a plurality of clusters/systems of nodes, a scalable fixed content storage cluster of preferably symmetric nodes includes an indexing system that facilitates the ability to locate objects within the cluster based on criteria of metadata associated with the content. To achieve high scale of indexing and querying the content, the processing is distributed to multiple nodes in the cluster and the index is broken up into shards. When the index is created, the number of shards is configured and cannot be changed without requiring the index to be regenerated. Search request will be distributed across all shards. A sharded request will go to the standard request handler to search the indexes in sharded cores.

The solution provides a way to manage the index shards throughout the system. The index shards will have master and optional N backup copies that will be grouped into regions. An individual master or a backup copy of a shard is called a shard core. An index core or shard core is a single index segment (primary/master or backup/redundant copy), while a shard defines a set of cores with primary-secondary or master-backup relationship. Each shard consists of two or more shard cores, namely, one primary shard core and one or more backups. A node is not required to host both a primary of a shard and a backup of some other shard. In extreme situations, a node may only host one shard core. Upon initial index creation, the number of regions/shards to create is determined from a number of cluster criteria including, for example: (1) number of nodes participating in the cluster, (2) configured Index Protection Level (IPL), i.e., number of index copies (or shard cores) per shard (an IPL of 2 means one backup copy for each master), and (3) node hardware capability to handle hosting multiple shards. For example, for a 4 node cluster where the nodes can handle hosting 8 shard cores (total of 8*4=32 shard cores), and an IPL of 2, the number of shards would be 4*8/2=16 shards. The shard cores would be distributed across the cluster based on available cluster resources as evenly as possible where no region/shard would be exposed to a single point of failure from either a node or volume unavailability.

III.A. Region/Shard Distribution

Figures 5, 6:
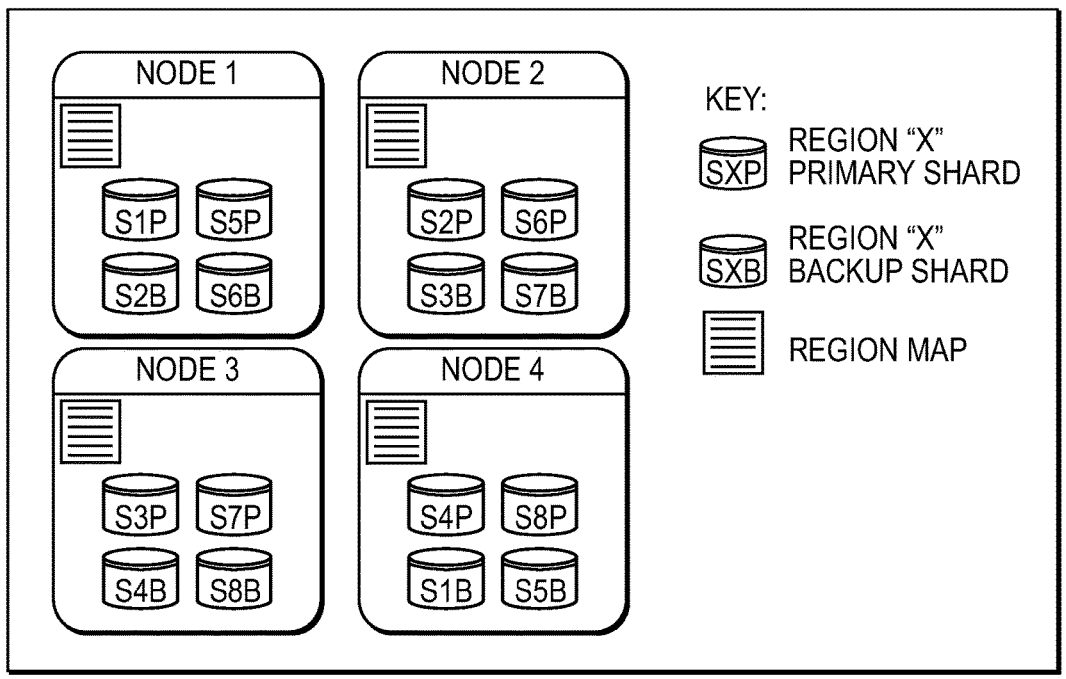
FIG. 5 is an example of a 4 node cluster with region/shard distribution.
FIG. 6 shows an example of a region mapping table.

For illustrative purposes, this description will consider a 4 node cluster with shard distribution as seen in FIG. 5. The cluster has nodes 1, 2, 3, 4. It will include 8 shards (S1 to S8) that each contain a master and one backup copy of an index shard, resulting in 16 shard cores (S1P, S1B, . . . , S8P, S8B). This will produce 4 index shard cores on each node. The master and backup copies of each shard will exist on separate nodes in the cluster to ensure index availability with a single point of failure. For example, shard 1 primary shard S1P is on node 1 while shard 1 backup shard S1B is on node 4, shard 2 primary shard S2P is on node 2 while shard 2 backup shard S2B is on node 1, shard 3 primary shard S3P is on node 3 while shard 3 backup shard S3B is on node 2, and shard 4 primary shard S4P is on node 4 while shard 4 backup shard S4B is on node 3, and so on. Each node includes a region map, which may take the form of a region mapping table.

FIG. 6 shows an example of a region mapping table. The table maps region/shard numbers for master shard and backup shard to nodes numbers. FIG. 6 has entries for one backup column because the example has one backup copy only. In general, the region mapping table can have multiple backup columns. The region mapping table identifies the node responsible for each copy (or shard core) of each region/shard.

This example configuration only allows for doubling the size of the cluster from 4 to 8, and is not a good representation as to the value of the inventive approach. A more realistic starting configuration would be where there are 8 shard cores per node (i.e., 16 regions). This would result in 16 primary and 16 backup shard cores, assuming only 1 backup per region. This would allow for the cluster configuration to grow to 8 times the size to 32 cluster nodes. Any growth beyond the 32 nodes would require the index to be rebuilt in order to take advantage of the additional processing and storage available from the nodes.

A cluster-wide indexing engine/module 342 (FIG. 3) is provided in each cluster/system of the replicated object storage system or content platform. The indexing module 342 manages the search index to make it highly available. Index management is handled at the volume level. The storage nodes can be configured with multiple index volumes (or index-enabled volumes) and the indexing module will utilize them. Every effort is made to separate the primary/secondary shard cores on volumes on separate nodes. If this topology cannot be satisfied, the shard cores are placed on different volumes in the same node. The indexing module automatically places the shard cores in the most optimal way within the constraints of the system configuration of the cluster.

The indexing module 342 organizes the index shards into regions/shards in a manner that is analogous to what the metadata manager (MM) 404 does for the metadata objects. However, the indexing module 342 operates independently from the metadata manager 404. The indexing module 342 selects a region/shard by hashing one or more object attributes, such as file path, and extracting a given number of bits of the hash value. These bits comprise a region/shard number. The bits selected may be low order bits, high order bits, or some other selection or combination of bits. As mentioned above, each region/shard is preferably stored redundantly, with one master/primary and preferably one or more backup/redundant copies. Region/Shard copies are distributed in the form of index shards across all the nodes of the cluster/system so as to balance the number of primary region/shard copies per node and to balance the number of total region/shard copies per node. In short, the indexing module 342 generates the region mapping table using a content index hash algorithm and locations of the shard cores.

The indexing module 342 may be implemented in a manner analogous to that of the metadata manager 404 as shown in FIG. 4 and described above. For instance, each region may have its own self-contained index, there may be one region manager for each region copy (or shard core), a backup shard core must be synchronized with its primary shard core by enforcing a given protocol between them, any failure at the node level or region manager level or the like will cause reassignment of region copies on the failed node so as to guarantee the integrity of the remaining region copies, and so on. In specific embodiments, each node in the cluster has its own indexing module but only one indexing module is active at any time within the cluster.

In the background, the indexing module 342 performs periodic queries against content platform content to find new content and updates the search index to include the new content. When the shards are being moved around (as discussed below in the context of node addition, node removal, etc.), this background processing is suspended. Once the movement of shards is completed, the background processing of the indexing module 342 will be resumed. This is done automatically and does not impact content ingest capabilities. The query indexer is expected to be able to catch up very quickly both because the movement is fast (smaller chunks) and query indexing is actually very efficient. The end user will not experience any disruptions in service when requesting queries against the index. In addition, the query requests will execute against the backup copies if the primary/master is in the process of being moved.

Figure 7:
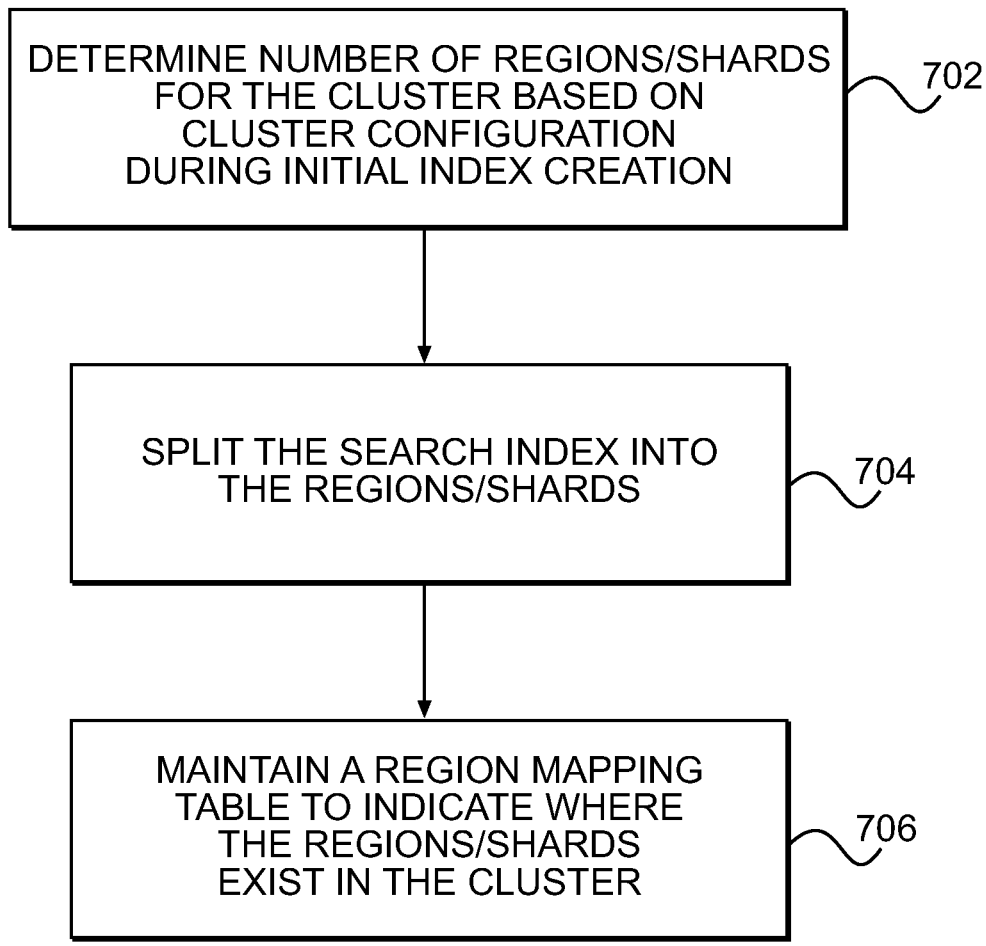
FIG. 7 is an example of a flow diagram illustrating a process performed by an indexing module in creating and managing a search index.

FIG. 7 is an example of a flow diagram illustrating a process performed by the indexing module 342 in creating and managing a search index. In step 702, the indexing module determines the number of regions/shards to be utilized for the cluster/system, based on the cluster configuration during initial index creation. In step 704, the indexing module splits the search index into the regions/shards. Each region/shard will have master and optional backup(s) of a piece (shard) of the index. There is preferably at least one backup copy for each master. In step 706, the indexing module maintains a region mapping table to indicate where the regions/shards exist in the cluster. The same region mapping table is provided in each node.

III.B. Node Addition

Figure 8:
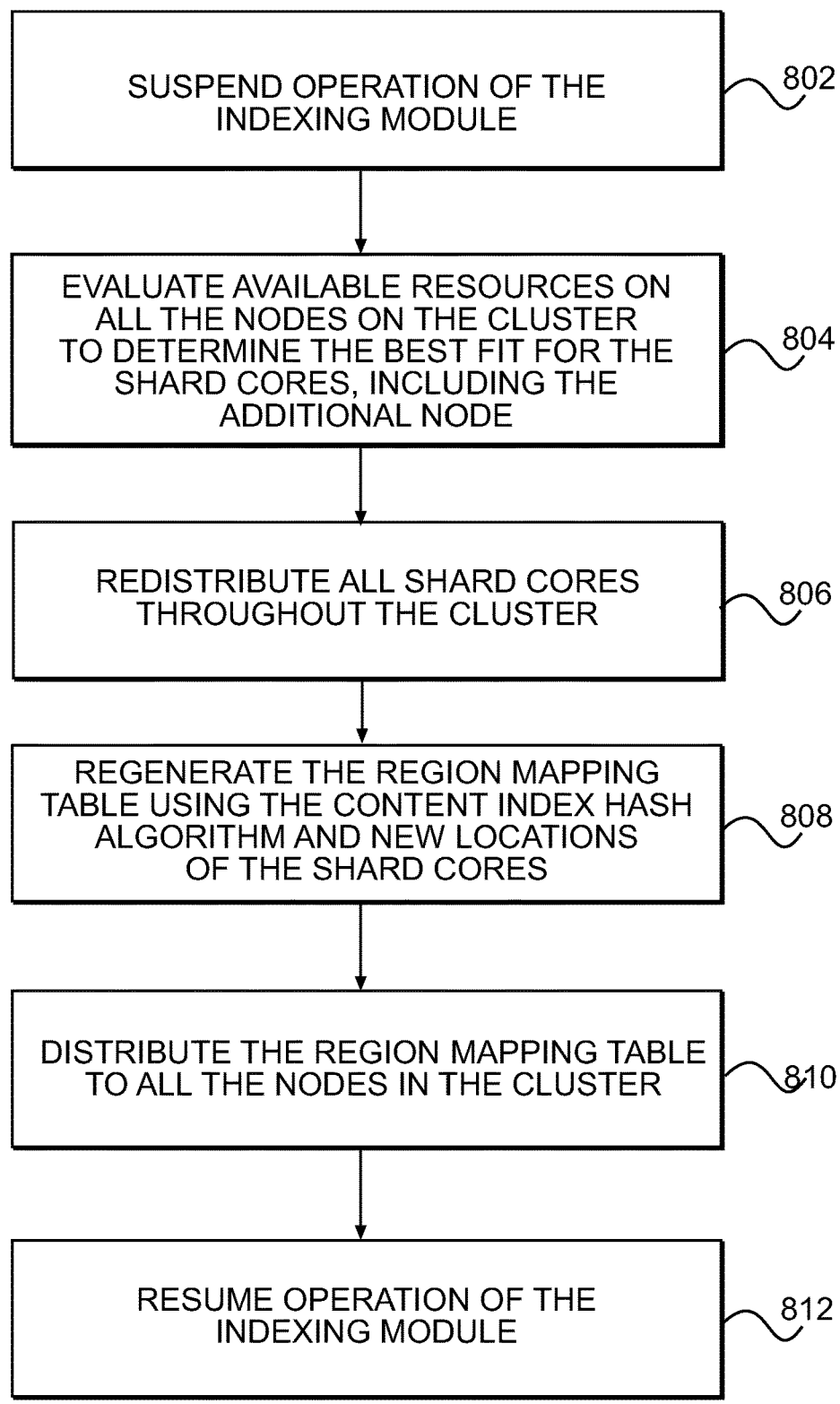
FIG. 8 is an example of a flow diagram illustrating a process performed by a node addition remapping module in managing the search index for node addition.

FIG. 8 is an example of a flow diagram illustrating a process performed by a node addition remapping module (typically a part of the cluster resource manager 344 in FIG. 3) in managing the search index for node addition. On node addition, no new regions/shards will be added to the cluster/system, but the node addition remapping module will redistribute the shard cores throughout the cluster to distribute the work load. In step 802, the operation of the indexing module 342 in the cluster (i.e., background processing of finding new content and updating the index) is suspended. In step 804, the node addition remapping module evaluates the available resources on all the nodes on the cluster to determine the best fit of the shard cores (see discussion below). In step 806, it redistributes all shard cores throughout the cluster. In step 808, it regenerates the region mapping table using the content index hash algorithm and new locations of the shard cores. In step 810, it distributes the region mapping table to all the cluster nodes. In step 812, the operation of the indexing module 342 is resumed. The node additional remapping module may be a separate module or a sub-module under the indexing module 342.

Figure 9:
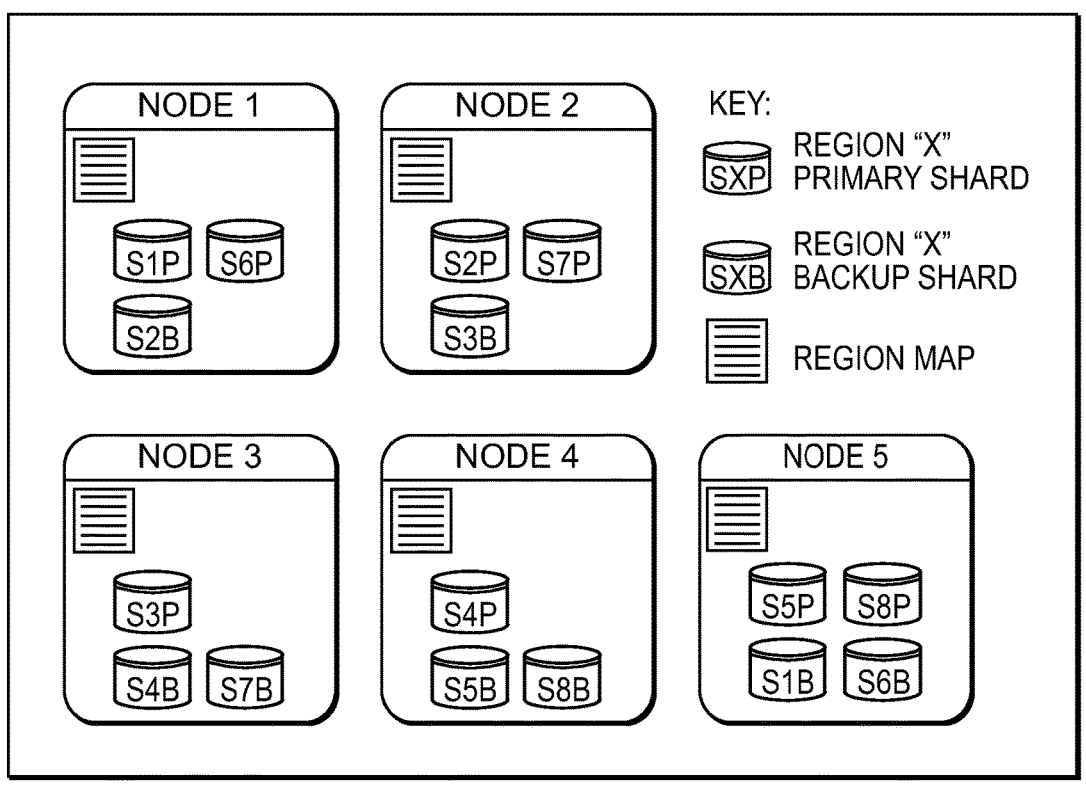
FIG. 9 shows an example of adding a fifth node to the 4 node cluster with region distribution of FIG. 5.

FIG. 9 shows an example of adding a fifth node to the 4 node cluster with shard distribution of FIG. 5. The cluster has nodes 1, 2, 3, 4, 5. It still has 8 shards (S1 to S8) with the same 16 shard cores (S1P, S1B, . . . , S8P, S8B). As a result of the redistribution of the shard cores, node 1 has S1P, S6P, and S2B, node 2 has S2P, S7P, and S3B, node 3 has S3P, S4B, and S7B, node 4 has S4P, S5B, and S8B, and node 5 has S5P, S8P, S1B, and S6B. Each node includes the regenerated region mapping table. The distribution of the shards is not necessarily uniform, but will depend on available resources on the nodes. In this example, node 5 may have been selected to host more shard cores (4 instead of 3) because it is a new node that likely has more resources to efficiently host the additional shard core.

III.C. Node Removal

When a node is temporarily unavailable or an index copy becomes corrupted, the region index is still available by redirecting the activity to a backup copy that exists on another node as indicated in the region mapping table. In contrast, when a node is removed or is permanently unavailable, the high availability of the regions/shards in the cluster must be maintained for those shards that existed on the node. The regions index copy will be regenerated on another node in the cluster.

Node removal of a node from a cluster in itself is not a frequent activity; however, with the fixed content system that supports replacing older technology nodes with newer technology nodes, the ability to add a node and subsequently remove older nodes will be supported by the method and apparatus of this invention. The steps to redistribute the shard cores to fewer nodes are similar to those of node addition with the obvious difference of fewer nodes being considered.

Figure 10:
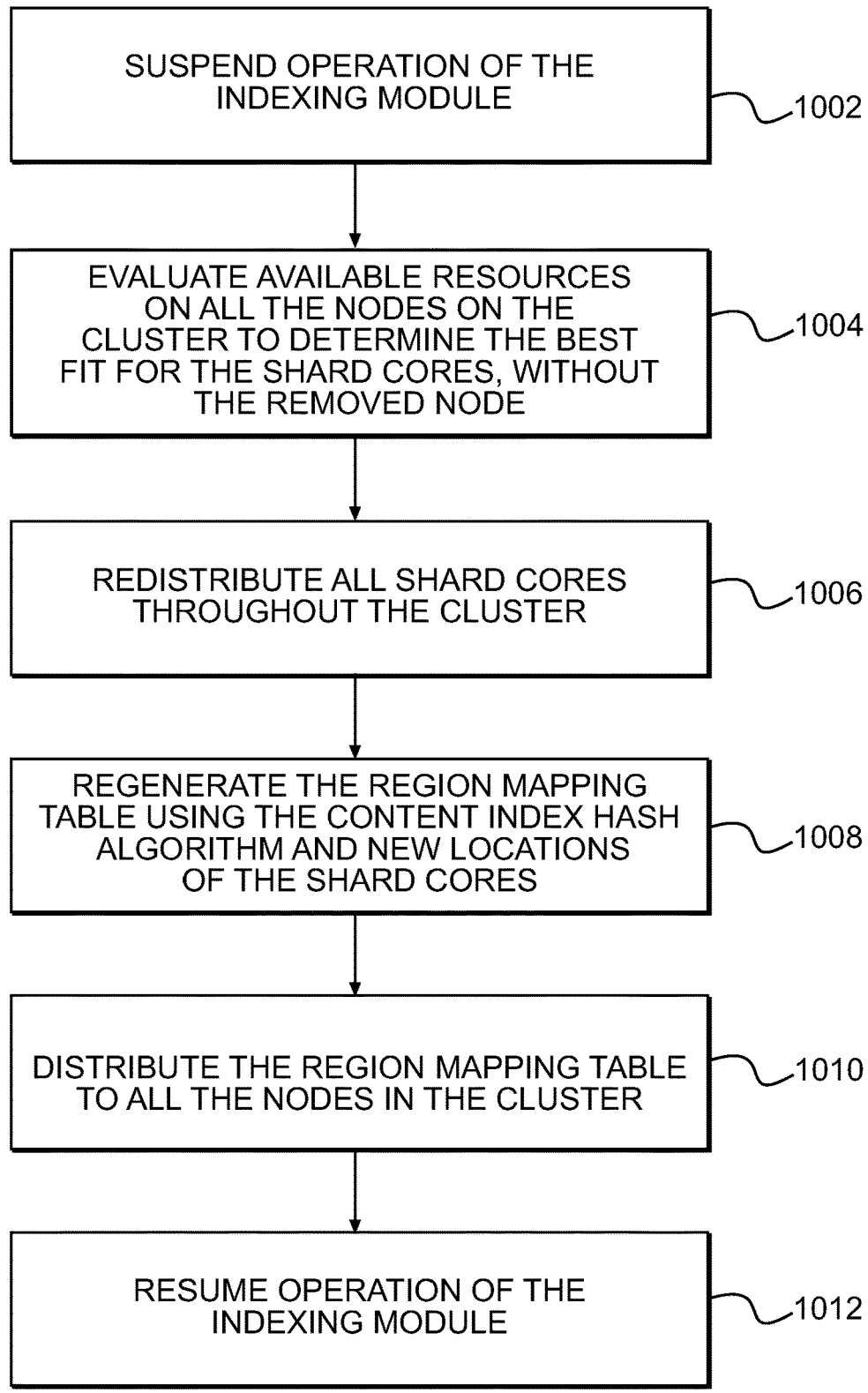
FIG. 10 is an example of a flow diagram illustrating a process performed by a node removal remapping module in managing the search index for node removal.

FIG. 10 is an example of a flow diagram illustrating a process performed by a node removal remapping module (typically a part of the cluster resource manager 344 in FIG. 3) in managing the search index for node removal. In step 1002, the operation of the indexing module 342 in the cluster (i.e., background processing of finding new content and updating the index) is suspended. In step 1004, the node removal remapping module evaluates the available resources on all the nodes to determine the best fit of the shard cores (see discussion below). In step 1006, it redistributes all the shard cores throughout the cluster. In step 1008, it regenerates the region mapping table using the content index hash algorithm and new locations of the shard cores. In step 1010, it distributes the region mapping table to all the cluster nodes. In step 1012, the operation of the indexing module 342 is resumed. The process of FIG. 10 can change the 5 node cluster of FIG. 9 to the 4 node cluster of FIG. 5. The node removal remapping module may be a separate module or a sub-module under the indexing module 342.

III.D. Core Recovery

The cluster/system has knowledge of when nodes are unavailable and can react to the events to ensure content availability. In the event that a node becomes unavailable for a preset threshold amount of time (but is not permanently removed), the system will regenerate all shard cores (backup (s) or master) that existed on the missing node.

Figure 11:
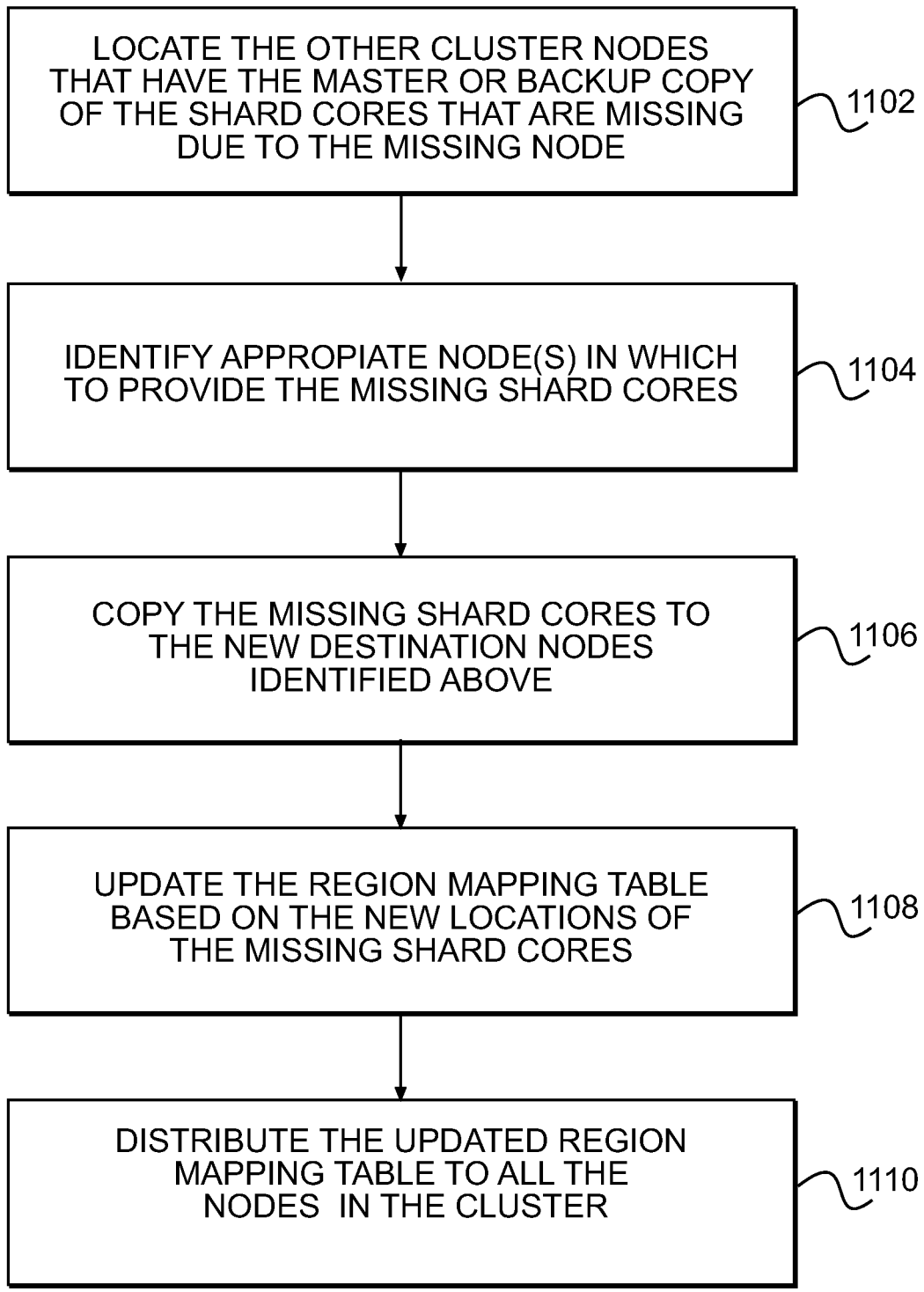
FIG. 11 is an example of a flow diagram illustrating a process performed by a core recovery remapping module in managing the search index for core recovery.

FIG. 11 is an example of a flow diagram illustrating a process performed by a core recovery remapping module (typically a part of the cluster resource manager 344 in FIG. 3) in managing the search index for core recovery. In step 1102, the core recovery remapping module locates the other cluster nodes that have the master or backup copy of the shard cores that are missing due to the missing or unavailable node. In step 1104, it identifies appropriate node(s), based on resource availability and point-of-failure considerations, in which to provide the missing shard cores. Point-of-failure considerations include, for example, situations where a node is unavailable because of hardware failure such as motherboard failure or a volume is unavailable because a SAN network link from node is non-functional due to HBA controller failure. In step 1106, it copies the missing shard cores to the new destination node(s) identified in step 1104. In step 1108, it updates the region mapping table based on the new locations of the missing shard cores. In step 1110, it distributes the updated region mapping table to all the nodes in the cluster. There is no need to suspend and resume operation of the indexing module 342 since the core recovery does not involve moving the shard cores and the indexing module 342 can continue operation with single copies of shard cores. If the missing node later comes back online after the core recovery, the cluster/system will respond by removing the duplicate shard cores and will go through the rebalancing throughout the cluster. The core recovery remapping module may be a separate module or a sub-module under the indexing module 342.

In the shard distribution and remapping processes described above, the indexing module 342, node addition remapping module, node removal remapping module, and core recovery remapping module decide where to place/ move shard cores independently of the metadata manager 404. The modules need only a list of index-enabled volumes for storing the shard cores among the cluster nodes. When placing/moving shard cores, the determination of which volume to use is based on both shard core or shard distribution and on load calculation. Master cores are typically placed on the "least-loaded index-enabled volume," while redundant cores are typically placed on the "least-loaded index-enabled volume where the master does not live."

Volume load is determined typically by a "best match" or "best fit" procedure. A ratio of available volume capacity to shard core count is calculated for each index-enabled volume, and typically normalized to whether or not the volume is shared or dedicated or whether shard cores exist currently or not. This ratio heavily favors volumes which have no shard cores or which have lots of free space for shard cores. The volumes are sorted by ratio (high to low) and are traversed until the module finds the best possible match (e.g., most space, least number of shard cores, separate node for redundant copy from master, separate volume for redundant copy from master). The load calculation enables the following behaviors for high availability and scalability. If a volume is approaching a utilization threshold or is full, a shard core is moved to a less loaded volume to free up space. If a volume becomes unavailable for an unacceptable amount of time, a new redundant copy may be built where there is space. If a volume is removed, an attempt is made to create a new redundant copy of the removed shard core(s) on the least loaded volume.

Of course, the system configurations illustrated in FIGS. 1 and 4 are purely exemplary of content platforms or replicated object storage systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for a highly available search index with storage node addition and removal in a replicated object storage system. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

CITATION LIST

Patent Literature

[PTL 1]
U.S. Patent Publication No. 2007/0189153
[PTL 2]
U.S. Pat. No. 7,657,581
[PTL 3]
U.S. Patent Publication No. 2011/0106802

What is claimed is:

1. In a system having a redundant array of independent nodes, and having a search index, which indexes contents for searching the contents, a method of managing the search index comprising the steps of:
 splitting the search index, which indexes contents for searching the contents, into a plurality of shards to be divided among a plurality of regions equal in number to the plurality of shards, each shard including a master shard core and at least one backup shard core, a number of the regions being larger than a number of the nodes in the system;
 distributing the shard cores to the plurality of nodes in the system in order to distribute the plurality of shards, which are the split search index, among the plurality of nodes;
 creating a region mapping table to map the shard cores to the nodes in the system in which the shard cores are stored;
 storing the region mapping table in each node in the system;
 querying the contents to find new content; and
 if new content is found, updating the master shard core corresponding to the new content and synchronizing the backup shard core with the updated master shard core,
 wherein the shard cores are distributed to the plurality of nodes in the system based on volume load of volumes of the nodes to store the shard cores, and
 wherein for node addition or node removal of a node in the system:
  evaluating available resources on the nodes on the system to determine placement of the shard cores among the nodes including the additional node or without the removed node;
  redistributing the shard cores among the nodes in the system based on the evaluation of the available resources;
  regenerating the region mapping table based on the redistribution of the shard cores; and
  distributing the regenerated region mapping table to the nodes in the system.

2. The method according to claim 1,
 wherein the shard cores are distributed to the plurality of nodes in the system so that, for a shard, the master shard core and the at least one backup shard core are stored in separate nodes if storage space is available, and if not, the master shard core and the at least one backup shard core are stored in separate volumes in the same node.

3. The method according to claim 1, further comprising:
 determining the number of regions in which to split the search index based on one or more of (1) the number of nodes in the system, (2) Index Protection Level (IPL) of the search index which controls the number of backup shard cores for the master shard core per region, and (3) node hardware capability of the nodes to handle hosting multiple shard cores.

4. The method according to claim 1, further comprising, for core recovery in the system after a node becomes unavailable for a preset threshold amount of time:
 locating one or more nodes in the system that have the master shard core or backup shard core of the shard cores that are missing due to the unavailable node;
 identifying one or more destination nodes in the system in which to provide the missing shard cores;
 copying the missing shard cores to the one or more destination nodes;
 updating the region mapping table based on the copying of the missing shard cores to the one or more destination nodes; and
 distributing the updated region mapping table to the nodes in the system.

5. In a system having a redundant array of independent nodes, an apparatus for managing a search index, which indexes contents to enable searching the contents, the apparatus comprising a processor, a memory, and an indexing module, the indexing module being configured to:
 split the search index, which indexes contents for searching the contents, into a plurality of shards to be divided among a plurality of regions equal in number to the plurality of shards, each shard including a master shard core and at least one backup shard core, a number of the regions being larger than a number of the nodes in the system;
 distribute the shard cores to the plurality of nodes in the system in order to distribute the plurality of shards, which are the split search index, among the plurality of nodes; and
 creating a region mapping table to map the shard cores to the nodes in the system in which the shard cores are stored;
 storing the region mapping table in each node in the system;
 querying the contents to find new content; and
 if new content is found, updating the master shard core corresponding to the new content and synchronizing the backup shard core with the updated master shard core,
 wherein the shard cores are distributed to the plurality of nodes in the system based on volume load of volumes of the nodes to store the shard cores, and
 wherein the apparatus further comprises a node addition remapping module for node addition of a node in the system, or a node removal remapping module for node removal of a node in the system, the node addition remapping module or node removal remapping module configured to:
 evaluate available resources on the nodes on the system to determine placement of the shard cores among the nodes including the additional node or without the removed node;
 redistribute the shard cores among the nodes in the system based on the evaluation of the available resources;
 regenerate the region mapping table based on the redistribution of the shard cores; and
 distribute the regenerated region mapping table to the nodes in the system.

6. The apparatus according to claim 5,
wherein the shard cores are distributed to the plurality of nodes in the system so that, for a shard, the master shard core and the at least one backup shard core are stored in separate nodes if storage space is available, and if not, the master shard core and the at least one backup shard core are stored in separate volumes in the same node.

7. The apparatus according to claim 5, wherein the indexing module is configured to:
determine the number of regions in which to split the search index based on one or more of (1) the number of nodes in the system, (2) Index Protection Level (IPL) of the search index which controls the number of backup shard cores for the master shard core per region, and (3) node hardware capability of the nodes to handle hosting multiple shard cores.

8. The apparatus according to claim 5, further comprising a core recovery remapping module which is configured, for core recovery in the system after a node becomes unavailable for a preset threshold amount of time, to:
locate one or more nodes in the system that have the master shard core or backup shard core of the shard cores that are missing due to the unavailable node;
identify one or more destination nodes in the system in which to provide the missing shard cores;
copy the missing shard cores to the one or more destination nodes;
update the region mapping table based on the copying of the missing shard cores to the one or more destination nodes; and
distribute the updated region mapping table to the nodes in the system.

9. The method according to claim 1, wherein when a master shard core of a particular shard on a particular node is unavailable to execute a query request, the query request is re-directed to the backup shard core of the particular shard for execution.

10. The apparatus according to claim 5, wherein when a master shard core of a particular shard on a particular node is unavailable to execute a query request, the query request is re-directed to the backup shard core of the particular shard for execution.

* * * * *